United States Patent [19]

Yang

[11] Patent Number: 5,737,037

[45] Date of Patent: Apr. 7, 1998

[54] SYNTHETIC COLOR TELEVISION SYSTEM HAVING DISPLAY USING AN INTEGRAL OVERLAPPING COLOR FILTER ASSEMBLY

[76] Inventor: Tai-Her Yang, No. 32 Lane 29, Taipin St., Si-Hu Town, Dzan-Hwa, Taiwan

[21] Appl. No.: 541,585

[22] Filed: Oct. 10, 1995

Related U.S. Application Data

[63] Continuation of Ser. No. 192,618, Feb. 7, 1994.

[51] Int. Cl.$^6$ ....................................................... H04N 9/16
[52] U.S. Cl. .................................. 348/742; 348/816
[58] Field of Search ............................ 348/816, 817, 348/742, 268, 70, 71; H04N 9/16, 9/04, 9/12

[56] References Cited

U.S. PATENT DOCUMENTS

| | | | |
|---|---|---|---|
| 2,493,200 | 1/1950 | Land | 348/816 X |
| 2,623,109 | 12/1952 | Bell | 348/268 |
| 2,638,499 | 5/1953 | Evans | 348/742 |
| 2,724,737 | 11/1955 | Hogan | 348/742 X |
| 2,727,941 | 12/1955 | Fulmer | 348/742 |
| 2,834,254 | 5/1958 | Sage | 348/816 X |
| 3,299,203 | 1/1967 | Gil De Gibaja | 348/816 |
| 3,428,743 | 2/1969 | Hanlon | 348/816 |
| 3,781,465 | 12/1973 | Ernstoff et al. | 178/5.4 BD |
| 4,611,889 | 9/1986 | Buzak | 348/742 X |
| 4,758,818 | 7/1988 | Vatne | 348/742 X |

OTHER PUBLICATIONS

Tsutomu Fujita, "Can MOS Imaging Sensors be Replaced with Camera Tubes", IEE (Journal of Electronic Engineering), vol. 18, No. 189, pp. 99–101, Sep. 1982, Hitachi Ltd, Tokyo, Japan.

Primary Examiner—Victor R. Kostak
Attorney, Agent, or Firm—Bacon & Thomas

[57] ABSTRACT

A synthetic color television system includes a color-filter for three primary colors and a brightness-sensitive medium. The color-filtering layers for the three primary colors are sequentially excited between the camera and objects taken by the camera so as to regulate the vertical and horizontal scanning signals and the sequence of signals of the three primary colors read from the brightness-changing signal series, or from a digital or analog source of image signals containing the above-mentioned signals transmitted to a displaying screen. A representation of the three primary color filtering screen displays synchronically the picture in the order of the three primary colors, creating a color picture effect through the persistence of vision on the three primary colors.

1 Claim, 3 Drawing Sheets

SYNTHETIC COLOR TELEVISION SYSTEM HAVING DISPLAY USING AN INTEGRAL OVERLAPPING COLOR FILTER ASSEMBLY

This application is a continuation of application Ser. No. 08/192,618, filed Feb. 7, 1994.

SUMMARY OF THE INVENTION

A synthetic color television system includes a color-filter assembly made up of filters for each of three primary colors, and a brightness-sensitive medium for capturing images of objects viewed through the periodically or sequentially activated filters. The color-filtering layers for the three primary colors are sequentially excited and placed between the camera and objects taken by the camera so as to regulate the vertical and horizontal scanning signal and control the sequence of the three primary colors read from a brightness-changing signal series, or from a digital or analog source of image signals containing the above-mentioned signals, the scanning and control signals being transmitted to a displaying screen which includes another three primary color filtering assembly for synchronically displaying the picture in the order of the three primary colors, thereby creating a color picture effect through the persistence of vision on the three primary colors.

DETAILED DESCRIPTION OF THE INVENTION

Figure 1:
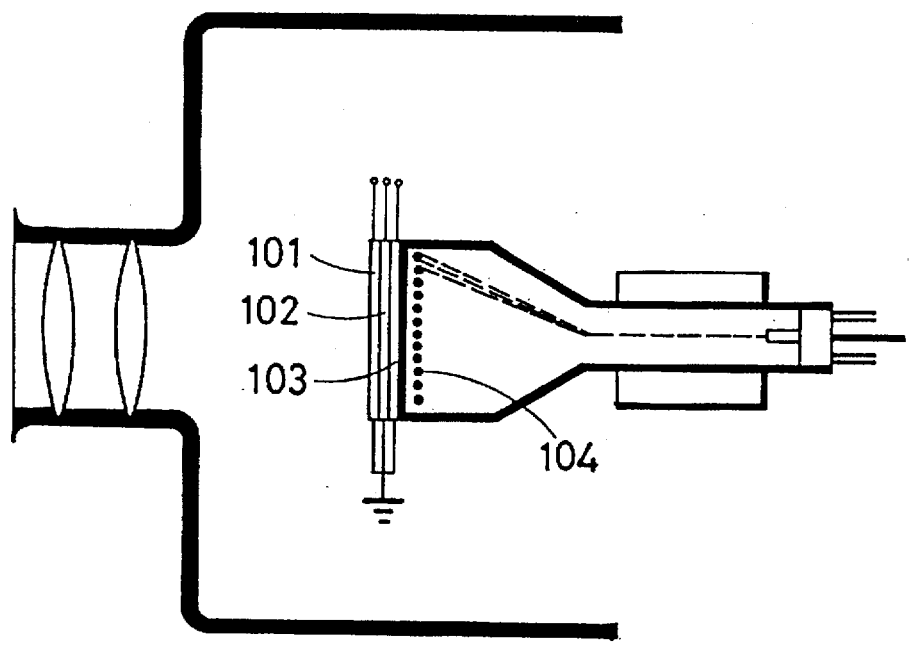
FIG. 1 is a schematic view of a camera/transmitter synthetic color television constructed in accordance with the principles of a preferred embodiment of the invention.

The synthetic color television system of the preferred embodiment includes a color-filter for three primary colors, and a brightness-sensitive medium in which the color-filtering for the three primary colors is sequentially excited so as to regulate the vertical and horizontal scanning signal and control the excitation signal sequence for the three primary colors read from a brightness-changing signal series, or from a digital or analog source of preliminary image signals containing the abovementioned signals transmitted to the displaying screen. A representation of the three primary color filtering screen displays synchronically the picture in the order of the three primary colors, thereby creating a color picture effect through the persistence of vision on the three primary colors. More specifically, the present invention includes:

1.) As shown in FIG. 1, a brightness-sensitive camera with a color-filter for the three primary colors, used for sensing a change in brightness and for testing the strength of the signals and telecast system according to the order of the scanning. As shown in FIG. 1, the camera is completely conventional except for the inclusion of a color-filter assembly for the three primary colors, the assembly including filter elements which are arranged to overlay one another, as shown in FIG. 1, so as to be superimposed between the camera lens and light sensitive layer 104 of the camera and fixed relative to light sensitive layer, the filter elements including a red filter element 101, a green filter element 102, and a blue filter element 103. Each filter may, for example, have a different gas filled in the interior of a transparent hollow panel, the transparent hollow panels being excited by means of dielectric poles. Alternatively, the filters may be formed from dielectric materials capable of color change, such as liquid crystal diodes. The filter elements have a special synchronizing scanning period for regulating the order of color changing so as to make the camera transmit, in order, the brightness and strength of signals from the horizontal and vertical scanning of the self-sensitive layer during periodic primary color-filtering by switching the color filters between a transparent state and a state in which a color-filtering effect is obtained. The strength of each color-filtering screen can be adjusted by adjusting the duty cycle of the excitation power supply.

Figure 3:
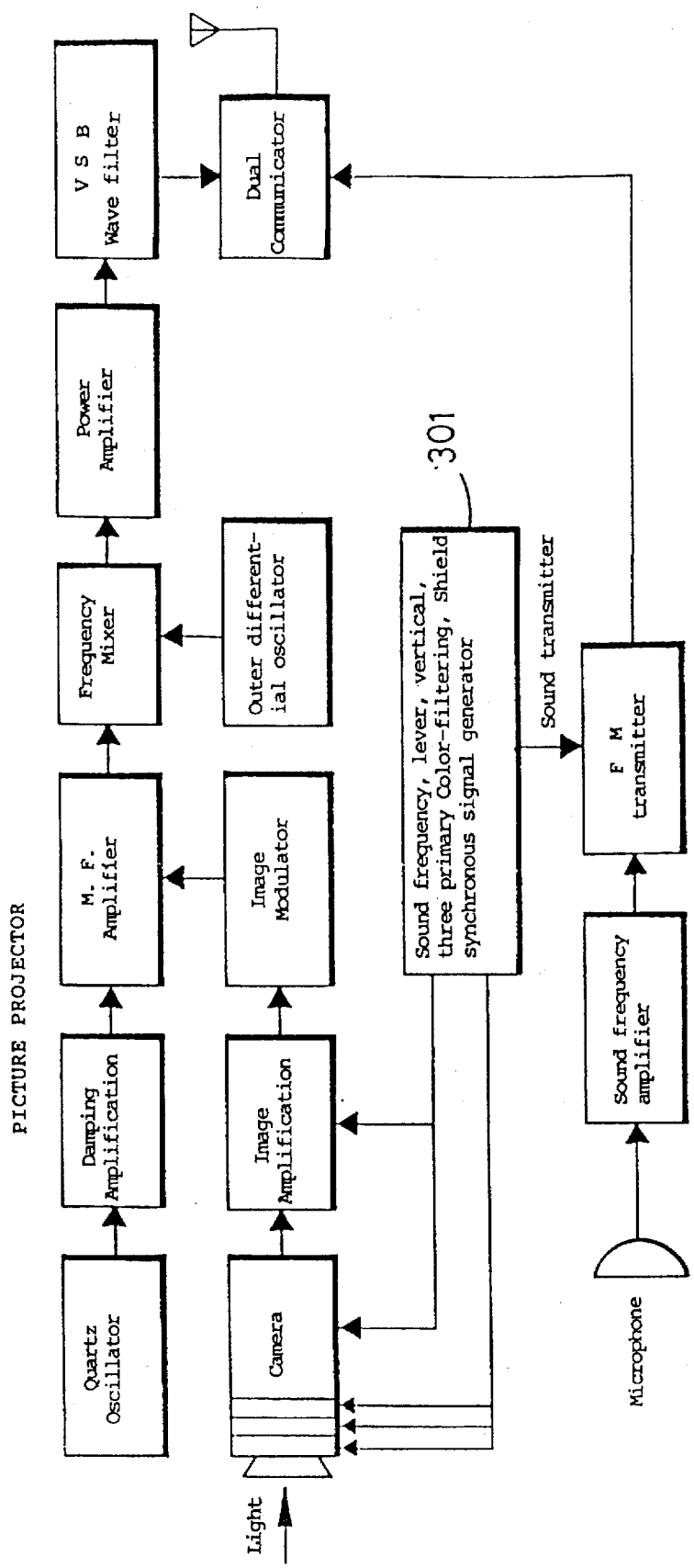
FIG. 3 is a block diagram of the preferred camera and transmitter of FIG. 1.

2.) As shown in FIG. 3, a synchronizing circuit 301 provides synchronous scanning signals for the three primary colors, in order, and the vertical/horizontal scanning video signals for scanning the light sensitive medium, and establishes a synchronous relationship between the color synchronization signals and the vertical and horizontal signals. The respective signals can be transmitted through cables or by radio-frequency broadcast to a monitor, or can be recorded and stored in a tape or a CD or other kinds of stationary/dynamic memory media. Those skilled in the art will appreciate that the remainder of the elements shown in FIG. 3 are conventional in nature and therefore not discussed in detail herein.

3) In the case of digital storage, a preliminary image input source transmits the digital signals from RAM, ROM, soft/hard disc, or tape to the display.

Figure 2:
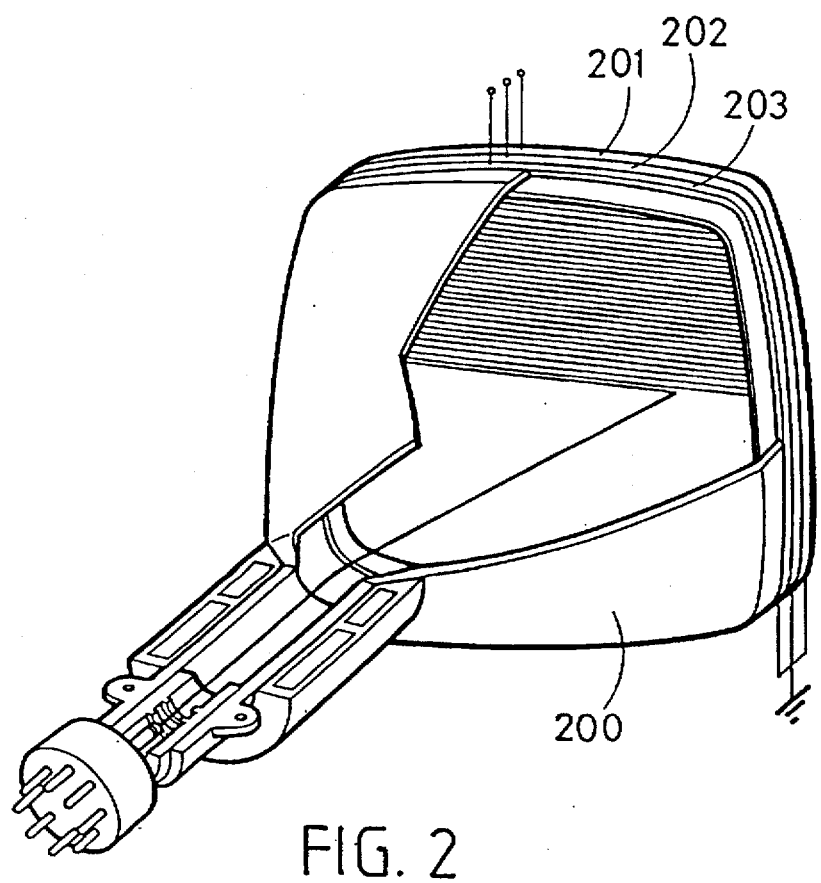
FIG. 2 is a schematic view of the receiver and display for a synthetic color television system corresponding to the system shown in FIG. 1.

4) As shown in FIG. 2, the synthetic color television system of the preferred embodiment includes a display in the form of a conventional cathode ray tube 200 for the display of images by means of the change of the brightness, and display the image according to the received signals in order of brightness-changing through vertical/horizontal scanning. The color-filtering screens for the three primary colors 201, 202, 203, which are constructed by LCD elements, or gas or solid dielectric color displays are arranged to overlay one another and fixed on the displaying screen of the above-mentioned picture-tube so as to be superimposed between the picture-tube and a viewer. Each color-filtering screen is controlled by means of the camera or preliminary image input source in synchronism with the vertical and horizontal scanning signal in the order of dielectricity, creating a color picture effect through the persistence of vision on the three primary colors.

Referring again to FIG. 3, the preferred video camera is connected with an audio frequency source, vertical/horizontal sync signal generator, conventional black-and-white camera and transmission system, and the control over the synchronous signal generator 301 of the three primary color filtering screens can produce different color light according to the order of excitation. In each color cycle, the light sensitive layer of the camera tube is vertically/horizontally scanned at least once and the signals it gets are as follows: When the first primary color filtering screen is activated, the brightness of the sensitive layer of the camera tube is obtained by scanning. When the second primary color filtering screen is activated, a first sample of the brightness of the sensitive layer of the camera tube is also obtained by scanning. Finally, another brightness scan is made when the third primary color filtering screen is activated. The system thus operates periodically and cyclically, when each primary color filtering screen is operating, it will transmit setup signals for synchronous identification of when each primary color filtering shield is working.

Figure 4:
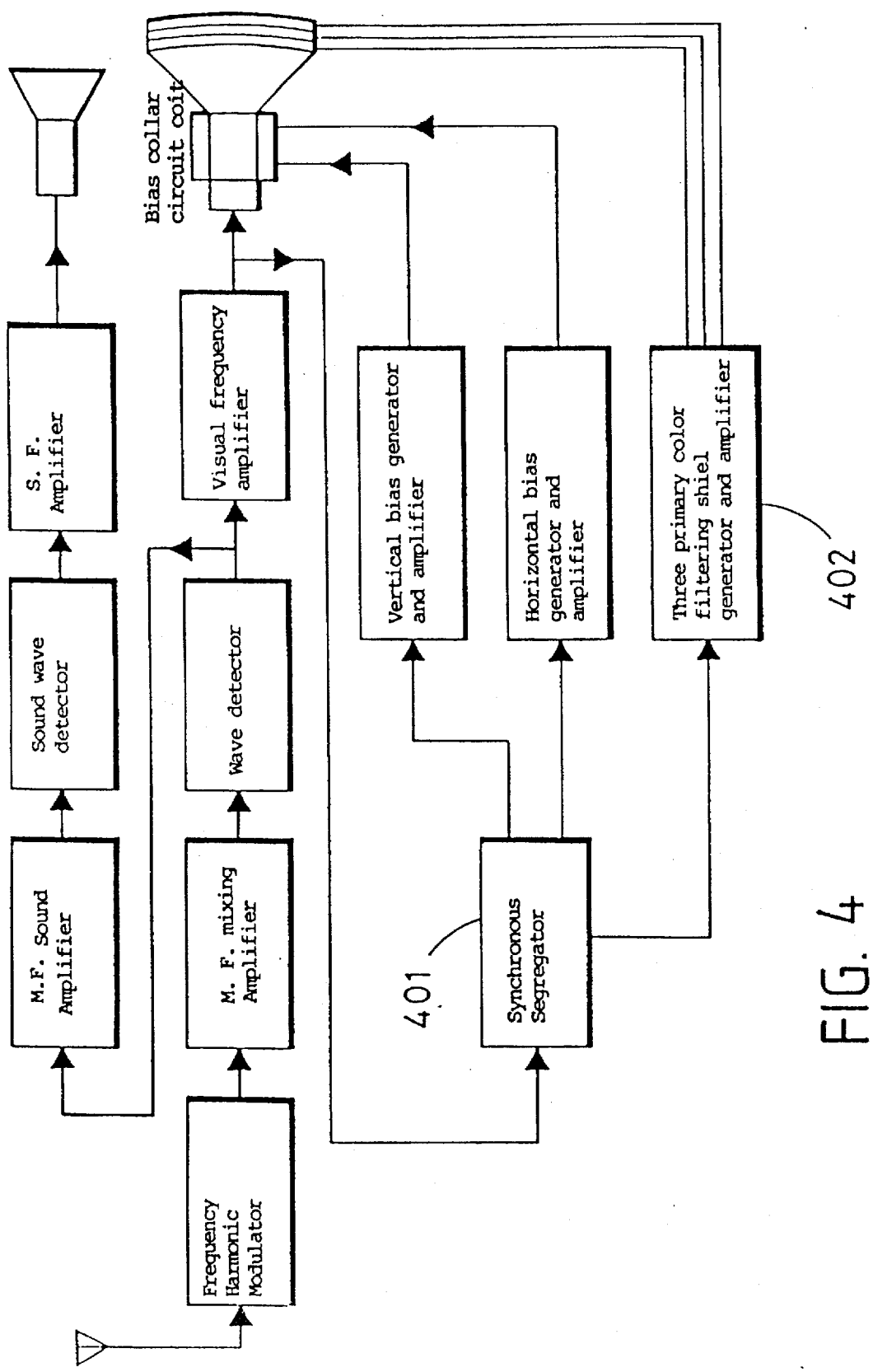
FIG. 4 is a block diagram of the preferred receiver and display shown in FIG. 2.

As shown in FIG. 4, the picture display is connected with the synchronous segregator 401 of a conventional black-and-white picture receiver and is controlled by the generator and amplifier 402 of the three primary color filtering shield so as to make the three primary color filtering screens produce relative color in accordance with the excitation order of the setup signals of the three primary colors mentioned above, under each situation of colored light, the picture tube screens of the display being vertically/horizontally controlled to scan once or more than once, resulting in ordering of the input signals such that when each of the first, second, and third primary color filtering shield is activated, the indicated scanning of the brightness for the picture tube occurs. As with the camera, the color filter screens for the display operate periodically and cyclically, which results in a synthetic color display function.

The technology of this system is thus the same as that of a conventional black-and-white picture tube, except that it includes circuitry for scanning synchronous signals of the three primary color screens, which can synchronously drive the transparent hollow panel color filtering screen and which is fixed between the sensitive layer of the camera screen and objects taken by the camera, as shown in FIG. 1, and also to the display screen, as shown in FIG. 2. In this way, a synthetic color television system using periodically switched color-filters for three primary colors is provided.

I claim:

1. A synthetic color television system comprising:

a) a camera including a light sensitive medium, means for scanning the light sensitive medium to detect an intensity of light reaching the medium, and an integral first color-filtering assembly comprising three color-filtering screens arranged to overlay one another so as to be serially superimposed between an image source and the scanning means, said screens being individually activatable to filter light of a respective one of three colors according to a sequence;

b) means for synchronizing activation of respective said screens and scanning of the light sensitive medium;

e) means for transmitting an image together with horizontal and vertical synchronization signals, and filter activation signals indicative of the sequence of activation of said color-filtering screens;

d) means for receiving said images and said scanning synchronization signals; and e) a display including a picture tube and an integral second color-filtering assembly including integral individually activatable screens corresponding to said color filtering screens of the camera and arranged to overlay one another and thereby be superimposed between the picture tube and a viewer, and means for causing said screens of the display to be activated in response to said filter activation signals according to said sequence in synchronism with said vertical and horizontal synchronization signals, wherein said second color-filtering assembly is fixed to said picture tube and said first color-filtering assembly is fixed with respect to said medium.

* * * * *